(12) United States Patent
Fuhst et al.

(10) Patent No.: US 7,628,205 B2
(45) Date of Patent: Dec. 8, 2009

(54) OPTIMIZED MACHINING PROCESS FOR CUTTING TUBULARS DOWNHOLE

(75) Inventors: Karsten Fuhst, Hanover (DE); Sven Krueger, Winsen (DE)

(73) Assignee: Baker Hughes Incorporated, Houston, TX (US)

( * ) Notice: Subject to any disclaimer, the term of this patent is extended or adjusted under 35 U.S.C. 154(b) by 143 days.

(21) Appl. No.: 11/728,461

(22) Filed: Mar. 26, 2007

(65) Prior Publication Data
US 2008/0236830 A1    Oct. 2, 2008

(51) Int. Cl.
E21B 29/00    (2006.01)
(52) U.S. Cl. ............................. 166/298; 166/55.7
(58) Field of Classification Search ............... 166/298, 166/55.7, 55.8; 175/230
See application file for complete search history.

(56) References Cited

U.S. PATENT DOCUMENTS

| | | | | |
|---|---|---|---|---|
| 1,471,526 | A * | 10/1923 | Pickin | 175/379 |
| 1,476,481 | A * | 12/1923 | Bashara et al. | 175/393 |
| 1,923,487 | A * | 8/1933 | Howard et al. | 175/426 |
| 1,945,160 | A * | 1/1934 | Pearce | 175/393 |
| 2,357,835 | A * | 9/1944 | Leissler | 175/393 |
| 2,482,674 | A * | 9/1949 | Kriegel | 166/55.8 |
| 2,690,897 | A * | 10/1954 | Clark, Jr. | 175/268 |
| 3,606,924 | A * | 9/1971 | Malone | 166/187 |
| 5,014,780 | A * | 5/1991 | Skipper | 166/55.8 |
| 5,678,466 | A | 10/1997 | Wahl | |
| 6,056,072 | A | 5/2000 | Koltermann et al. | |
| 6,568,489 | B1 | 5/2003 | Hailey | |
| 6,868,901 | B2 | 3/2005 | Mason et al. | |
| 2001/0001935 | A1 | 5/2001 | Wilk, Jr. et al. | |
| 2001/0045146 | A1 | 11/2001 | Fisher et al. | |
| 2002/0060073 | A1 | 5/2002 | Dewey et al. | |
| 2003/0070812 | A1 | 4/2003 | Robertson | |
| 2003/0159826 | A1 | 8/2003 | Ohmer | |
| 2004/0045714 | A1 | 3/2004 | McGavern, III et al. | |
| 2004/0089478 | A1 | 5/2004 | Cruickshank et al. | |
| 2004/0140090 | A1 | 7/2004 | Mason et al. | |
| 2005/0023044 | A1 | 2/2005 | Schuffenhauer et al. | |
| 2005/0061551 | A1 | 3/2005 | DeGeare et al. | |
| 2005/0133224 | A1 | 6/2005 | Ruttley | |
| 2005/0145389 | A1 | 7/2005 | Barrow et al. | |
| 2005/0150656 | A1 | 7/2005 | Stowe | |
| 2005/0173123 | A1 | 8/2005 | Lund et al. | |
| 2005/0247171 | A1 | 11/2005 | Kawashima | |
| 2006/0011344 | A1 | 1/2006 | Lynde et al. | |
| 2006/0137877 | A1 | 6/2006 | Watson et al. | |
| 2006/0196671 | A1 | 9/2006 | Robichaux | |
| 2006/0233619 | A1 | 10/2006 | Kamiyama et al. | |
| 2006/0254773 | A1 | 11/2006 | Schlegelmilch et al. | |
| 2007/0000696 | A1 | 1/2007 | Laflin | |

(Continued)

OTHER PUBLICATIONS

International Search Report dated Aug. 20, 2008.

Primary Examiner—Hoang Dang
(74) Attorney, Agent, or Firm—Bracewell & Giuliani LLP (57) ABSTRACT

The tubular cutter disclosed herein is useful for severing downhole tubulars and comprises a drive system, a pivoting system, a cutting head, and a cutting member. Cutting is accomplished by rotatingly actuating the cutting head with an associated motor, and then radially extending the cutting blade away from the cutting head. In one embodiment, the cutting head includes a cutting member that pivotally extends from the cutting head upon rotation of the cutting head.

14 Claims, 6 Drawing Sheets

U.S. PATENT DOCUMENTS

2007/0017708 A1 1/2007 Radford et al.
2007/0131410 A1 6/2007 Hill et al.
2007/0181305 A1 8/2007 McGavern, III et al.

* cited by examiner

OPTIMIZED MACHINING PROCESS FOR CUTTING TUBULARS DOWNHOLE

BACKGROUND OF THE INVENTION

1. Field of the Invention

The disclosure herein relates generally to the field of severing a tubular member. More specifically, the present disclosure relates to an apparatus for cutting downhole tubulars. Yet more specifically, described herein is a method and apparatus for optimizing cutting tubulars wherein lubrication is maintained between the cutting member and the tubular.

2. Description of Related Art

Tubular members, such as production tubing, coiled tubing, drill pipe, casing for wellbores, pipelines, structural supports, fluids handling apparatus, and other items having a hollow space can be severed from the inside by inserting a cutting device within the hollow space. As is well known, hydrocarbon producing wellbores are lined with tubular members, such as casing, that are cemented into place within the wellbore. Additional members such as packers and other similarly shaped well completion devices are also used in a wellbore environment and thus secured within a wellbore. From time to time, portions of such tubular devices may become unusable and require replacement. On the other hand, some tubular segments have a pre-determined lifetime and their removal may be anticipated during completion of the wellbore. Thus when it is determined that a tubular needs to be severed, either for repair, replacement, demolishment, or some other reason, a cutting tool can be inserted within the tubular, positioned for cutting at the desired location, and activated to make the cut. These cutters are typically outfitted with a blade or other cutting member for severing the tubular. In the case of a wellbore, where at least a portion of the casing is in a vertical orientation, the cutting tool is lowered (such as by wireline, tubing, or slickline) into the casing to accomplish the cutting procedure.

BRIEF SUMMARY OF THE INVENTION

Disclosed herein is a tubular cutting system and method wherein lubrication is delivered during cutting. The system employs a rotating blade and a lubrication system for dispensing lubrication between the blade's cutting surface and the tubular to be cut. Optionally an isolation material may be included for retaining the lubrication in the cutting region.

DETAILED DESCRIPTION OF THE INVENTION

Described herein is a method and apparatus for cutting and severing a tubular. While the apparatus and method described herein may be used to cut any type and length of tubular, one example of use involves severing tubing disposed within a wellbore, drill pipe, wellbore tubular devices, as well as wellbore casing. One embodiment of a cutting tool 10 as described herein is shown in side partial cut away view in FIG. 1. In this embodiment, the cutting tool 10 comprises a body 11 disposed within a tubular 5. As noted, the tubular 5 may be disposed within a hydrocarbon producing wellbore, thus in the cutting tool 10 may be vertically disposed within the wellbore tubular. Means for conveying the cutting tool 10 in and out of the wellbore include wireline, coiled tubing, slick line, among others. Other means may be used for disposing the cutting tool 10 within a particular tubular. Examples of these include drill pipe, line pigs, and tractor devices for locating the cutting tool 10 within the tubular 5.

Figure 1:
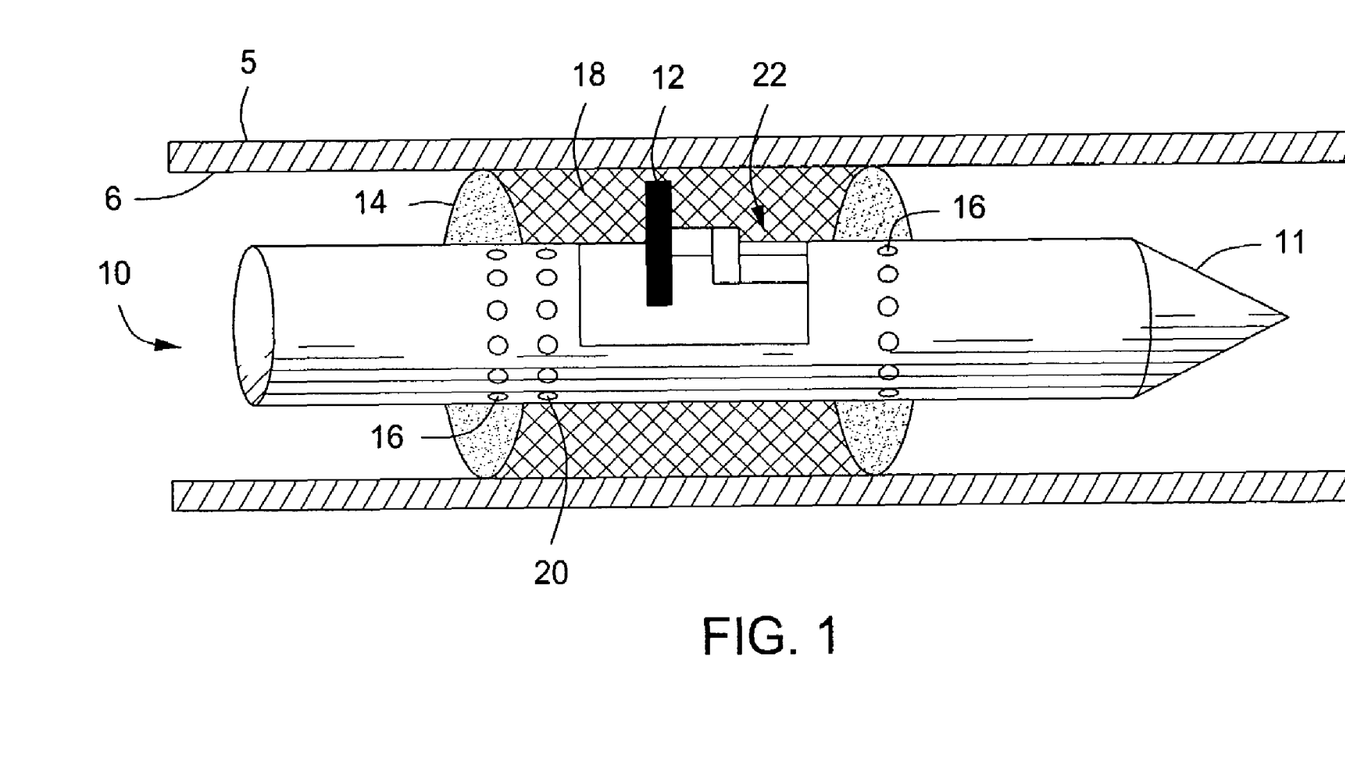
FIG. 1. is a side view of an embodiment of a cutting tool in a tubular.

Included within the body 11 of the cutting tool 10 is a cutting member 12 shown pivotingly extending out from within the body 11. A lubricant 18 is shown (in cross hatch symbology) disposed in the cutting zone 22 formed between the outer surface of the tool 10 and the inner circumference 6 of the tubular 5. For the purposes of discussion herein, the cutting zone 22 is designed as the region on the inner circumference of the tubular, as well as the annular space between the tool and the tubular proximate to the portion of the tubular that is being cut by the cutting tool. Examples of lubricants include hydrogenated polyolefins, esters, silicone, fluorocarbons, grease, graphite, molybdenum disulfide, molybdenum sulfide, polyolefins,ethylene, animal oils, vegetable oils, mineral oils, and petroleum based oils.

Lubricant 18 inserted between the cutting member and the inner circumference 6 enhances tubular machining and cutting. The lubricant 18 may be injected through ports or nozzles 20 into the annular space between the tool 10 and the tubular 5. These ports 20 are shown circumferentially arranged on the outer surface of the tool housing 11. The size and spacing of these nozzles 20 need not be arranged as shown, but instead can be fashioned into other designs depending upon the conditions within the tubular as well as the type of lubricant used. As discussed in more detail below, a lubricant delivery system may be included with this device for storing and delivering the lubricant into the area between the cutting member and the inner circumference of the tubular 6. In many situations when disposing a cutting tool within a tubular, especially a vertically oriented tubular, lubricants may be quickly drawn away from where they are deposited by gravitational forces. Accordingly, proper lubrication during a cutting sequence is optimized when lubrication is maintained within the confines of the cutting zone 22.

Additional ports 16 are shown disposed on the outer surface of the housing 11 for dispensing an isolation material 14 into the space between the tubular 5 and the tool 10. The lubricant port 20 location with respect to the isolation port 16 location enables isolation material 14 to be injected on opposing sides of the lubricant 18. Isolation material being proximate to the lubricant can retain a lubricant within or proximate to the cutting zone 22. Referring again to FIG. 1, an isolation material 14 is disposed in the annular space between the tool 10 and the tubular 5 and on opposing ends of the lubricant 18. Thus the isolation material should possess sufficient shear strength and viscosity to retain its shape between the tool 10 and the tubular and provide a retention support for the lubricant 18.

Examples of isolation materials include a gel, a colloidal suspension, a polysaccharide gum, xanthan gum, and guar gum. One characteristic of suitable isolation material may include materials that are thixotropic, i.e. they may change their properties when external stresses are supplied to them. As such, the isolation material should have a certain amount of inherent shear strength, high viscosity, and surface tension in order retain its form within the annular space and provide a retaining force to maintain the lubricant in a selected area. Thus, as shown in FIG. 1, the presence of the isolating material on opposite sides of the lubricant helps retain the lubricant within the cutting zone.

Figure 2:
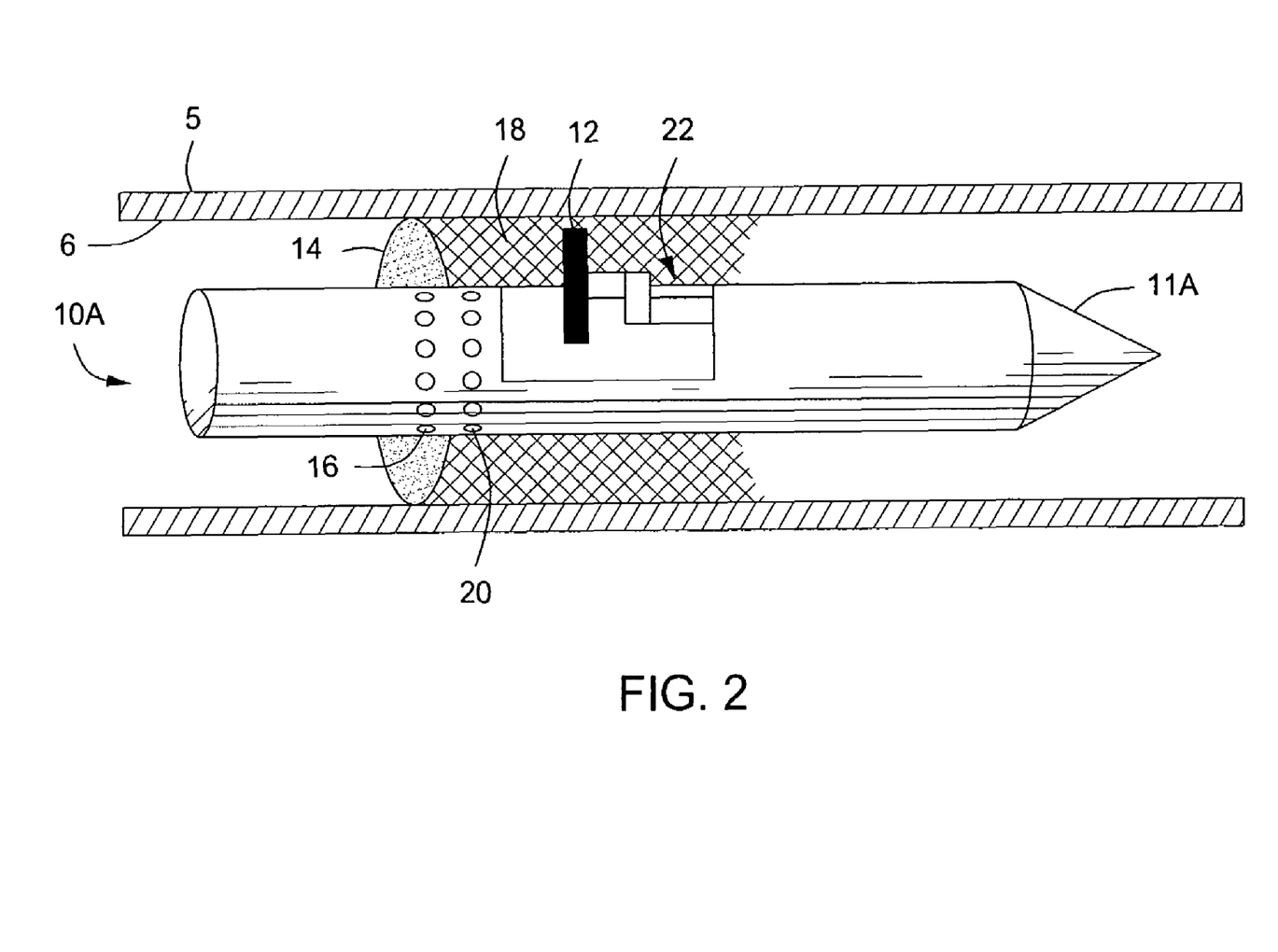
FIG. 2 is a side view of an alternative embodiment of a cutting tool in a tubular.

An alternative embodiment of a cutting tool 10a is provided in side partial cross sectional area in FIG. 2. In this embodiment, a single set of nozzles 16 is provided on the body 11a. Optionally, in this situation, the isolation material nozzles 16 could be disposed lower than the lubrication nozzles 20.

Figure 3:
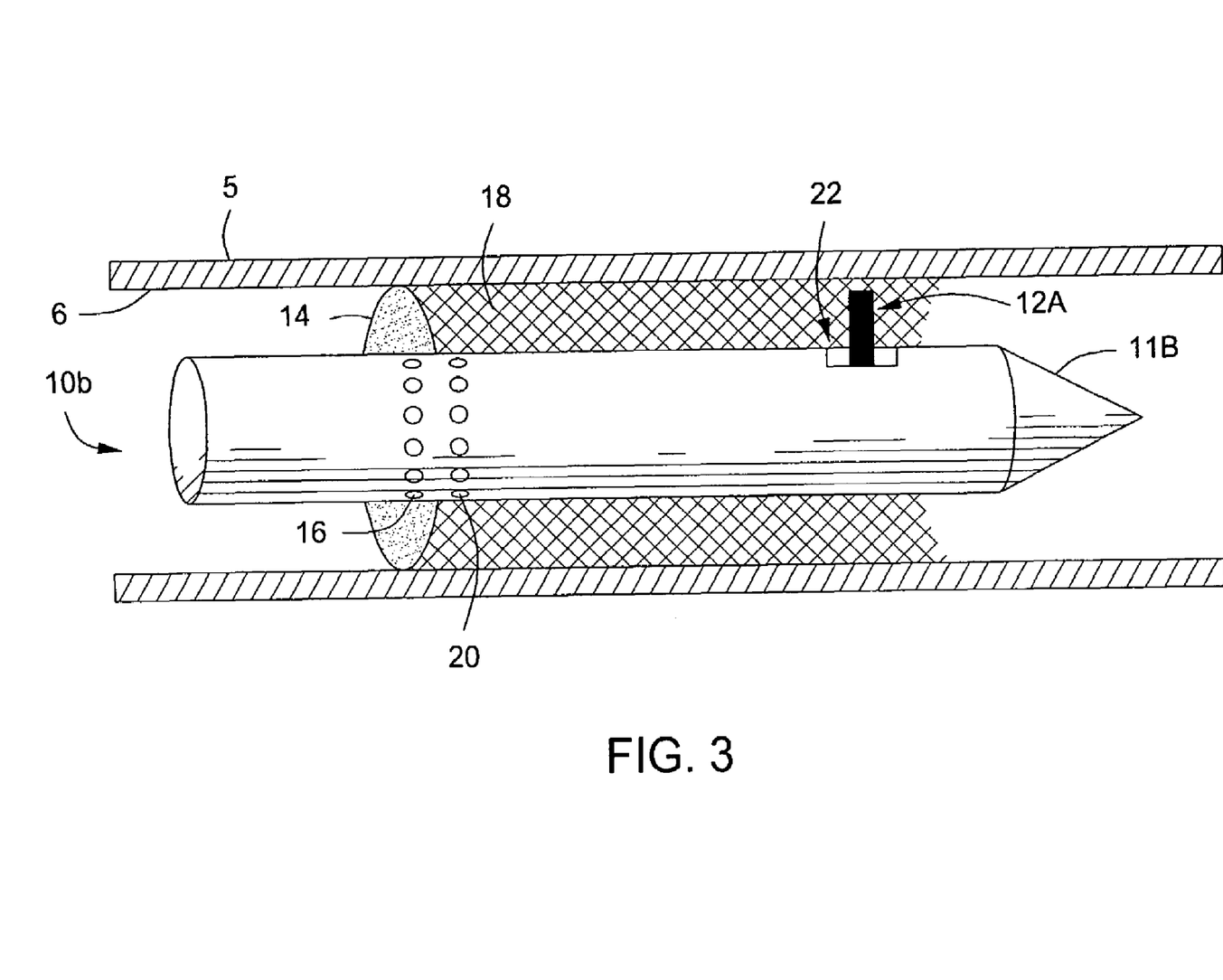
FIG. 3 is a side view of an alternative embodiment of a cutting tool in a tubular.

Yet another embodiment of a cutting tool 10b for use in cutting tubulars with added lubrication is provided in side view in FIG. 3. In this embodiment the cutting member 12a is a straight blade affixed to a portion of the body 11b. Although in this embodiment a single set of nozzles 16 is shown for disposing isolation material 14 into the annular space between the cutting tool 10b and the inner surface 6 of the tubular 5, multiple sets of nozzles can be included with this embodiment along the length of the cutting tool 10b. As shown, the lubricant 18 has been injected into the tubular 5 between the tool 10b and the tubular inner circumference 6. Thus, the cutting zone 22 includes lubrication for enhancing any machining or cutting by the tool 10b. Isolation material 14 is also injected into the annular space between the tool 10b and the tubular thereby providing a retaining support for the lubricant 18.

Figure 4A:
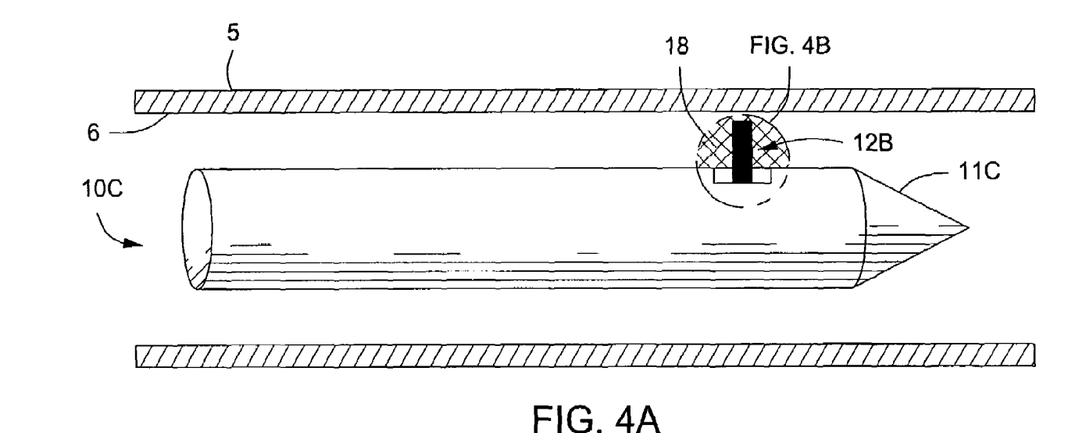
FIG. 4a is a side view of a cutting tool having a lubrication system.
Figure 4B:
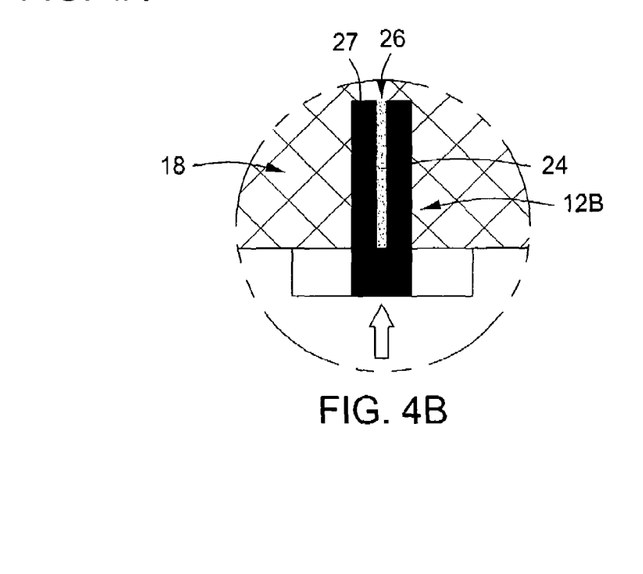
FIG. 4b is a magnified side view of a cutting tool with a lubrication system.

Another embodiment for delivering lubrication to a cutting surface is provided in FIGS. 4a and 4b. Here an example is provided of delivering a lubricant 18 to the cutting surface of a cutting blade by installing conduits within the blade itself. More specifically a cutting tool 10c is shown in side view in FIG. 4a. In this embodiment the cutting member 12b is a blade attached to a portion of the body 11c. The cutting tool 10c is rotated thereby urging the single blade into rotational cutting contact with the inner surface 6 of a tubular 5. A reservoir (not shown) is disposed within the body 11c for delivering lubricant 18 in this space between the cutting surface and the tubular inner surface 6. A series of passages or conduits attached to the reservoir for the lubricant to flow to the tip of the cutting member 12b. As shown in partial cut away side view in FIG. 4b, is a supply line 24 formed co-planerly along the length of the blade and terminating in a nozzle exit 26 at the tip of the blade 12b on its cutting surface 27. As such, lubricant 18 may be constantly supplied out into the nozzle exit 26 during a tubular cutting procedure. Thus lubricant is provided between the cutting surface 27 and the inner surface 6 for enhancing machining of the tubular by the cutting tool 10c.

Figure 5:
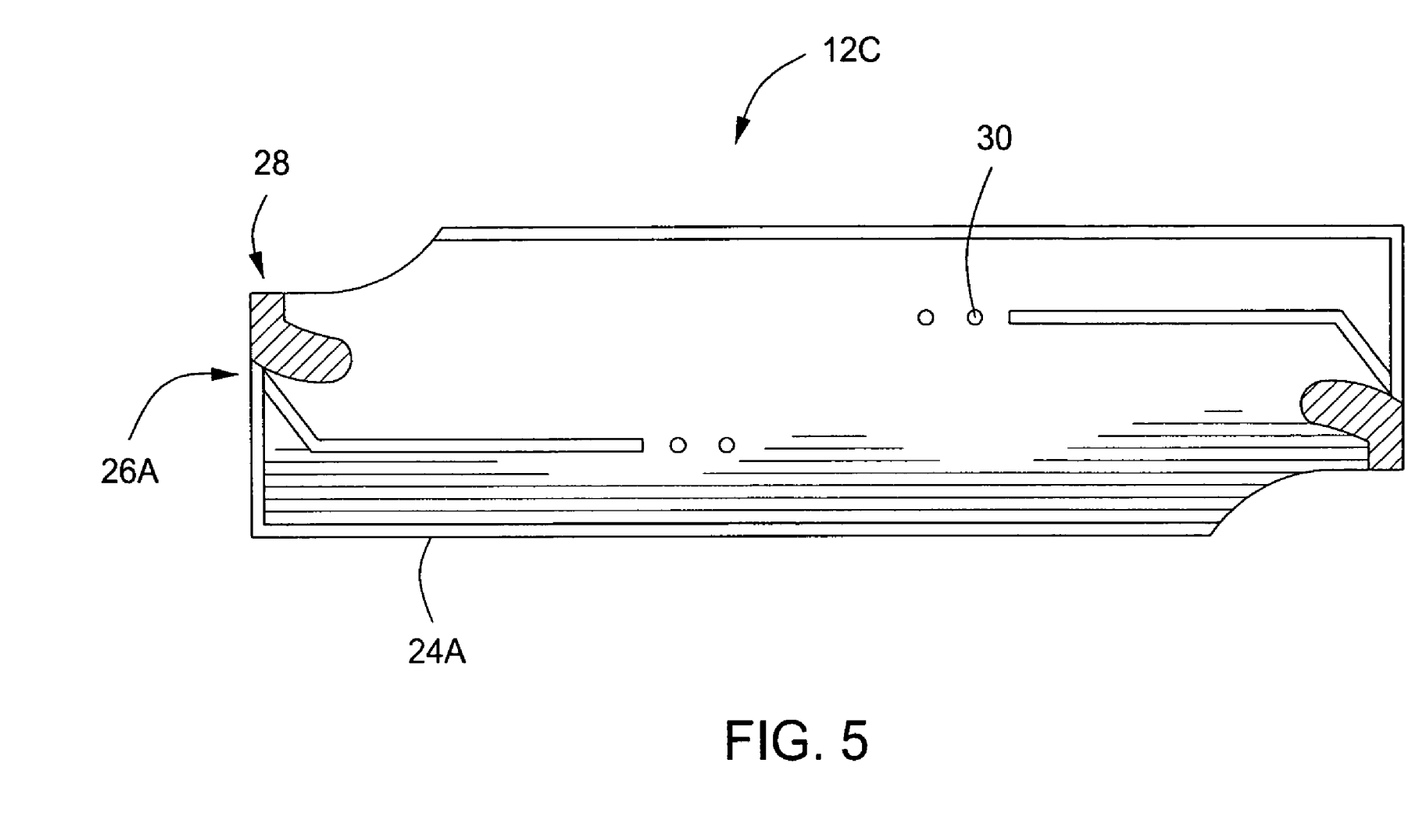
FIG. 5 is an overhead view of a cutting blade having lubrication delivery ducts.

FIG. 5 provides an overhead view of one example of a cutting member 12c. In this view the cutting member comprises a blade 15 having conduits formed within its surface for delivering lubricant to a cutting surface. In this embodiment, the cutting member 12c includes an inlay 28 on its cutting surfaces. The blade 15 can be rotationally attached and rotated during cutting so that the opposing cutting surfaces 26a may be used for severing a tubular. As with the cutting member of FIG. 4b, a supply line 24a is shown traveling along the side length of the cutting surface and terminating at an exit nozzle 26a proximate to the cutting surface. Therefore during cutting operations delivering a lubricant through a nozzle exit 26a will deliver lubricant on the cutting surface during a cutting sequence for optimizing machining of the tubular. By injecting lubricant on the cutting surface just prior to cutting that surface ensures lubricant will be in place during cutting. Optionally a nozzle could be formed on the blade 15 cutting edge so that lubricant is added during the entire cutting sequence and is present between the cutting blade 15 and the cutting surface.

Figure 6:
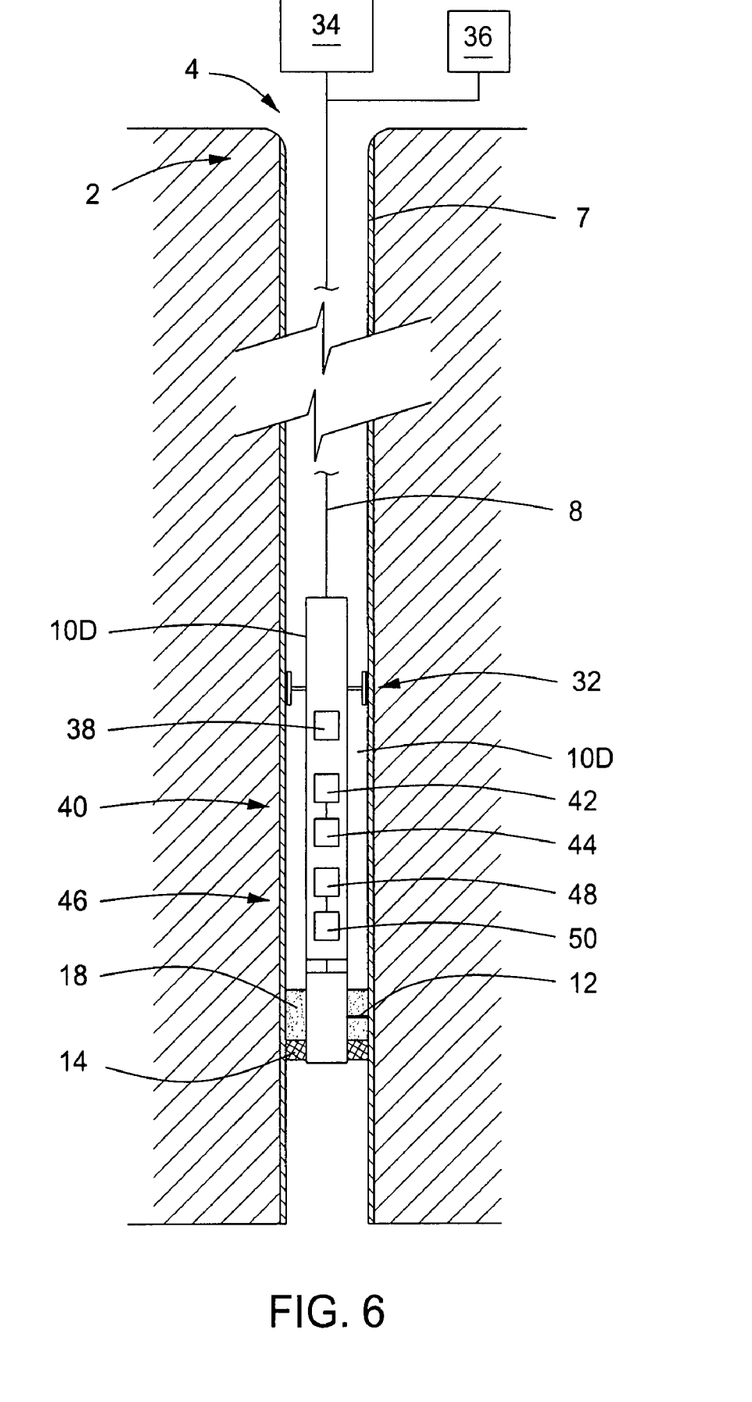
FIG. 6 is a partial cut away view of a cutting tool disposed in a cased wellbore.

FIG. 6 provides a partial side cut away view of an embodiment of a cutting system used in cutting a tubular 7. In this embodiment a cutting tool 10d is shown disposed in a cased wellbore 4 by a conveyance means 8. The tubular 7 is coaxially disposed within the wellbore casing. Optionally, the cutting tool 10d may be employed for cutting the wellbore casing and used in the same fashion it is used for cutting the tubular 7. Examples of means used in deploying the tool in and out of a wellbore by the conveyance means include wireline, slick line, coil tubing, and any other known manner for disposing a tool within a wellbore. This embodiment of the cutting tool 10d includes a controller 38, a lubricant delivery system 40, an isolation material delivery system 46, and a cutting member 12. The controller 38, which may include an information handling system, is shown integral with the cutting tool 10d and used for controlling the operation of the cutting tool 10d when disposed within the tubular. The controller may be configured to have preset commands stored therein, or can receive commands offsite or from another location via the conveyance means 8.

As its name suggests, the lubricant delivery system 40 comprises a system for delivering lubricant within the space between the cutting member and the tubular. In this embodiment the system comprises a lubricant pressure system 42 in communication with a lubricant reservoir 44. Here the pressure system 42 (which may be spring loaded, a motor driven pump, or have pressurized gas) is used for propelling lubricant within the reservoir 44 through the tool 10d and adjacent the cutting member 12 as described above.

Similar to the lubricant delivery system, the isolation material delivery system 46 also comprises a pressure supply 48 and a reservoir 50. The pressure supply 48 (may also be a pump, spring loaded device, or have compressed gas) is used in propelling the isolation material from the reservoir 50 and out into the annular space surrounding the tool 10d and inside the tubular. It should be pointed out that the sequence of introducing the isolation material and the lubricant into the tubular can be simultaneous. Optionally either the isolation material or the lubricant may be delivered into the annular space before the other in sequential or time step fashion. As far as the amount of lubricant or isolation material delivered, it depends on the particular dimensions of the tool as well as the tubular being severed, it is believed it is well within the capabilities of those skilled in the art to design a system for delivering a proper amount of lubricant as well as isolation material.

As shown with the embodiment of FIG. 6, the cutting member is in a cutting sequence for cutting the tubular 7 and isolation material 14 is shown retaining a quantity of lubricant adjacent the cutting member 12 thereby maintaining the lubricant in the space between the cutting member and the tubular 7. A controller 34 disposed at surface may be employed to control the tool 10d. The controller may be a surface truck disposed at the surface as well as any other currently known or later developed manner of controlling a wellbore tool from the surface. Included optionally is an information handling system 36 that may be coupled with the controller 34 either in the same location or via some communication either wireless or hardwire.

It should be pointed out that the exit nozzles can have the same cross sectional area as the supply lines leading up to these nozzles, similarly other types of nozzles can be employed, such as a spray nozzle having multiple orifices, as well as an orifice type arrangement where the cross sectional area at the exit is substantially reduced to either create a high velocity stream or to atomize the lubricant for more dispersed application of a lubricant.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of cutting a tubular comprising:
    inserting a cutting member within the tubular;
    disposing a lubricant between the cutting member and the tubular; and
    adding an isolation material adjacent the lubricant, wherein the isolation material is selected from the list consisting of a gel, a colloidal suspension, a polysaccharide gum, xanthan gum, and guar gum.

2. The method of claim 1 wherein the lubricant is selected from the list consisting of mineral oils, vegetable oils, animal oils, and synthetic lubricants.

3. The method of claim 1 further comprising activating the cutting member into cutting contact with the tubular.

4. The method of claim 1, wherein the isolation material selectively retains the lubricant in a cutting zone surrounding the cutting member.

5. The method of claim 4, further comprising cutting the tubular with the cutting member, wherein the step of cutting occurs within the cutting zone.

6. The method of claim 1 further comprising controlling the cutting member with a controller disposed within the tubular.

7. The method of claim 1, wherein the tubular is selected from the list consisting of downhole tubulars, drill pipe, and wellbore casing.

8. The method of claim 1 further comprising controlling the cutting member with a controller disposed at the surface and wherein the tubular is selected from the list consisting of downhole tubulars, drill pipe, and wellbore casing.

9. The method of claim 1, wherein the lubricant is retained within the tubular on a first end by a first quantity of isolation material and a second end by a second quantity of isolation material, wherein the first and second end intersect the tubular axis.

10. A method of severing a tubular within a wellbore comprising:
    disposing a cutting tool having a cutting surface within the wellbore;
    injecting a lubricant between the cutting surface and the inner surface of the tubular; and
    injecting a retaining material adjacent the lubricant thereby selectively retaining the lubricant between the cutting surface and the inner surface.

11. The method of claim 10 wherein the step of injecting a retaining material comprises adding a first quantity of retaining material within the tubular and adding a second quantity of retaining material within the tubular, wherein the first and second quantities of retaining material are disposed at different locations along the tubular axis.

12. The method of claim 11, wherein the lubricant is retained between the first and second quantities of retaining material.

13. The method of claim 10 wherein the lubricant is selected from the list consisting of mineral oils, vegetable oils, animal oils, and synthetic lubricants.

14. The method of claim 10, wherein the isolation material is selected from the list consisting of a gel, a colloidal suspension, a polysaccharide gum, xanthan gum, and guar gum.

* * * * *